United States Patent
Fischer et al.

(10) Patent No.: US 6,656,988 B1
(45) Date of Patent: Dec. 2, 2003

(54) MOULDING SUBSTANCES BASED ON POLY-$C_2$-$C_6$-ALKYLENE TEREPHTHALATES

(75) Inventors: Michael Fischer, Ludwigshafen (DE); Herbert Fisch, Wachenheim (DE); Michael Nam, München (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/857,056
(22) PCT Filed: Nov. 29, 1999
(86) PCT No.: PCT/EP99/09269
§ 371 (c)(1), (2), (4) Date: May 31, 2001
(87) PCT Pub. No.: WO00/32685
PCT Pub. Date: Jun. 8, 2000

(30) Foreign Application Priority Data

Dec. 2, 1998 (DE) .......................... 198 55 599

(51) Int. Cl.⁷ ................................. C08K 5/10
(52) U.S. Cl. ....................................... 524/315
(58) Field of Search ......................... 524/315

(56) References Cited

U.S. PATENT DOCUMENTS

| | | | | |
|---|---|---|---|---|
| T999,002 I4 | * | 10/1980 | Twiggs ................. | 427/385.5 |
| 4,421,804 A | | 12/1983 | Mori et al. ............ | 428/35 |
| 4,612,221 A | * | 9/1986 | Biel ........................ | 428/35 |
| 5,200,446 A | * | 4/1993 | Bergner ................. | 524/173 |
| 5,356,972 A | | 10/1994 | Sperling et al. ...... | 524/313 |
| 5,746,814 A | * | 5/1998 | Malhotra .............. | 106/18 |
| 5,795,696 A | * | 8/1998 | Malhotra .............. | 430/124 |
| 5,925,698 A | * | 7/1999 | Steckel ................. | 524/322 |

FOREIGN PATENT DOCUMENTS

| | | |
|---|---|---|
| EP | 0 492 550 | 7/1992 |
| JP | 51148745 | 11/1976 |
| JP | 9053005 | 2/1997 |
| JP | 4120162 | 4/1999 |

OTHER PUBLICATIONS

Percell et al. "Selective fatty chemical as mold–release agents" Plastics Engineering vol. 43 No. 9 (1987) pp. 33–36.

* cited by examiner

*Primary Examiner*—Edward J. Cain
(74) *Attorney, Agent, or Firm*—Keil & Weinkauf

(57) ABSTRACT

Glycerol fatty acid esters of $C_{12}$–$C_{24}$ fatty acids which may have one hydroxyl group and from 1 to 3 carbon-carbon double bonds are used as an additive for molding compositions based on poly-$C_2$–$C_6$-alkylene terephthalates.

The thermoplastic molding composition comprises, based on the total of components A and B and, if present, C to E, which together give 100 % by weight, a) as component A, from 40 to 99.99% by weight of at least one polyester based on poly-$C_2$–$C_6$-alkylene terephthalates, b) as component B, from 0.01 to 3% by weight of glycerol fatty acid esters of $C_{12}$–$C_{24}$ fatty acids which may have a hydroxyl group and from 1 to 3 carbon-carbon double bonds, c) as component C, from 0 to 49.99% by weight of blend polymers miscible with component A or dispersible therein, d) as component D, from 0 to 50% by weight of fillers, and e) as component E, from 0 to 10% by weight of other usual additives.

4 Claims, No Drawings

MOULDING SUBSTANCES BASED ON POLY-$C_2$-$C_6$-ALKYLENE TEREPHTHALATES

The invention relates to molding compositions based on poly-$C_2$–$C_6$-alkylene terephthalates and comprising mold-release agents, and also to the use of certain mold-release agents in the molding compositions.

Polybutylene terephthalate and polybutylene terephthalate blends are widely processed by extrusion or injection molding to give moldings, which are used in a variety of consumables in the household, the food and drink and the medical sector. To produce the moldings, additives are generally added to the polybutylene terephthalate to give good demolding performance, i.e. to allow short cycle times and prevent formation of mold deposits. The additive here should not change the other aspects of the performance of the polybutylene terephthalate.

When plastics are used in the food and drink or the medical sector, the transfer of substances from the plastic to the food or into the body has to be prevented. In this connection there are, for example, specifications from the Food and Drug Administration (FDA) in the U.S. and from the BGA (German Federal Board of Health) in Germany.

It is an object of the present invention to provide thermoplastic molding compositions based on poly-$C_2$–$C_6$-alkylene terephthalates and comprising a mold-release agent which is not hazardous to health and which, in particular, has low volatility in the molding composition.

We have found that this object is achieved by using glycerol fatty acid esters of $C_{12}$–$C_{24}$ fatty acids which may have a hydroxyl group and from 1 to 3 carbon-carbon double bonds as an additive for molding compositions based on poly-$C_2$–$C_6$-alkylene terephthalates.

They are used in particular as mold-release agents. The glycerol fatty acid esters may be mono-, bis- or triesters. They are preferably glycerol bis(fatty acid) esters. The fatty acids here derive from $C_{12}$–$C_{24}$ fatty acids, preferably $C_{14}$–$C_{20}$ fatty acids, in particular $C_{16}$–$C_{18}$ fatty acids, which may have a hydroxyl group and from 1 to 3 carbon-carbon double bonds. They preferably have zero, one or two carbon-carbon double bonds. If they have a hydroxyl group, they preferably also have one or two carbon-carbon double bonds. The fatty acid radicals are generally linear. Examples of fatty acids which can be used in the glycerol fatty acid esters are stearic acid, linoleic acid, linolenic acid, oleic acid, palmitic acid, castor oil fatty acid and nonanoic acid. Other suitable fatty acids are known to the skilled worker. The glycerol fatty acid esters here may be prepared by known processes.

Glycerol bisstearate is used in particular as a mold-release agent. This compound is available, for example, from Henkel with the trade name Loxiol® VPG 1206. The glycerol fatty acid esters and glycerol bisstearates used according to the invention fulfill the requirements placed upon compounds which may come into contact with foods or with the human body.

Glycerol bisstearates have previously been used mainly for extruding and injection molding polymers such as PVC, which can be processed at relatively low temperatures, below 220° C. The reason for this is that glycerol bisstearates are increasingly volatile at higher temperatures. For example, a thermogravimetric analysis of a glycerol bisstearate shows a marked weight loss from about 220° C. At from 250 to 270° C., the temperature range for processing polybutylene terephthalate and polybutylene terephthalate blends, the weight loss measured is up to 5% (from 40 to 340° C., 10° C./min). The mold-release agents used hitherto for polybutylene terephthalate have therefore been those such as fully esterified pentaerythritols, which have markedly lower volatility under these conditions. For example, the weight loss for a fully esterified pentaerythritol at 270° C. is less than 1% (from 40 to 340° C., 10° C./min).

According to the invention, it has been found that mixtures of the abovementioned glycerol fatty acid esters, in particular of glycerol bisstearate, with polybutylene terephthalate are significantly less volatile in a mold-release agent than the volatility of the separate compounds would suggest. Without being bound by any particular theory, this may be due to the fact that the ester on the surface of a molding has a sufficiently good degree of binding to polybutylene terephthalate. The properties of polybutylene terephthalate with glycerol bisstearate additive are no different from the properties of a polymer with additives which are known mold-release agents for polybutylene terephthalate. This is shown both by thermogravimetric measurements and by studies on demolding performance and on deposit formation in molds at a processing temperature of 260° C., and also by studies on long-term migration (11 days/150° C.). There is also no adverse effect on other aspects of performance, such as rheological, mechanical and thermal properties. The mixtures made from the glycerol fatty acid esters used according to the invention and molding compositions based on poly-$C_2$–$C_6$-alkylene terephthalates may be used universally, either in unreinforced or else in reinforced molding compositions.

The molding compositions here are based on poly-$C_2$–$C_6$-alkylene terephthalates. These may be pure poly-$C_2$–$C_6$-alkylene terephthalates or polymer blends made therefrom. They may in particular be polybutylene terephthalates or polybutylene terephthalate blends.

The invention also provides a thermoplastic molding composition comprising, based on the total of components A and B and, if present, C to E, which together give 100% by weight, a) as component A, from 40 to 99.99% by weight of at least one polyester based on poly-$C_2$–$C_6$-alkylene terephthalates, b) as component B, from 0.01 to 3% by weight of glycerol fatty acid esters of $C_{12}$–$C_{24}$ fatty acids which may have a hydroxyl group and from 1 to 3 carbon-carbon double bonds, c) as component C, from 0 to 49.99% by weight of blend polymers miscible with component A or dispersible therein, d) as component D, from 0 to 50% by weight of fillers, and e) as component E, from 0 to 10% by weight of other usual additives.

Component A

The novel molding composition comprises, as component A, from 40 to 99.99% by weight of a polyester based on poly-$C_2$–$C_6$-alkylene terephthalates. Polymers of this type are known per se.

The polyesters may be prepared by reacting terephthalic acid, its esters or other ester-forming derivatives with 1,4-butanediol, 1,3-propanediol or, respectively, 1,2-ethanediol in a manner known per se.

Up to 20 mol% of the terephthalic acid may be replaced by other dicarboxylic acids. Examples of these which may be mentioned are naphthalenedicarboxylic acids, isophthalic acid, adipic acid, azelaic acid, sebacic acid, dodecanedioic acid and cyclohexanedicarboxylic acids, mixtures of these carboxylic acids and ester-forming derivatives thereof.

It is also possible for up to 20 mol% of the dihydroxy compounds 1,4-butanediol, 1,3-propanediol and 1,2-ethanediol to be replaced by other dihydroxy compounds, such as 1,6-hexanediol, 1,4-hexanediol, 1,4-cyclohexanediol, 1,4-di(hydroxymethyl)cyclohexane, bisphenol A, neopentyl glycol, mixtures of these diols or ester-forming derivatives thereof.

Preferred aromatic polyesters are polyethylene terephthalate (PET), polytrimethylene terephthalate (PTT) and in particular polybutylene terephthalate (PBT), which have been formed exclusively from terephthalic acid and the corresponding diols. Some or all of the aromatic polyesters may also be in the form of recycled polyester materials, such as PET regrind made from bottle material or from bottle-production waste.

Component B

The glycerol fatty acid esters used according to the invention as component B have been described above. The amount in which they are used is from 0.01 to 3% by weight, preferably from 0.2 to 1.5% by weight, particularly preferably from 0.2 to 1.0% by weight.

Component C

The molding compositions may comprise, as component C, from 0 to 49.99% by weight, preferably from 0 to 40% by weight, particularly preferably from 0 to 30% by weight of blend polymers miscible with component A or dispersible therein. These may, for example, be conventional (grafted) rubbers. Use may in particular be made of graft copolymers which may have been built up from $C_1$–$C_{10}$-alkyl acrylates as graft base and from conventional ethylenically unsaturated monomers as graft.

Examples of these are:

Ethylene-vinyl acetate rubbers, silicone rubbers, polyether rubbers, hydrogenated diene rubbers, polyalkenamer rubbers, acrylate rubbers, ethylene-propylene rubbers, ethylene-propylene-diene rubbers, butyl rubbers, methyl methacrylate-butadiene-styrene (MBS) rubbers and methyl methacrylate-butyl acrylate-styrene rubbers, as long as these are miscible with component A and/or dispersible therein. Preference is given to using acrylate rubber, ethylene-propylene (EP) rubber, ethylene-propylene-diene (EPDM) rubber. Other possible materials are miscible polymers or copolymers, such as polycarbonates, polymethacrylates, in particular PMMA, polyphenylene ethers or syndiotactic polystyrene. It is also possible to use reactive rubbers which link to the polyester (component A) via a covalent bond, for example particulate acrylate rubbers and/or polyolefin rubbers grafted with anhydrides, such as maleic anhydride, or with epoxy compounds, such as glycidyl methacrylate. Finally, it is also possible to use one or more graft copolymers made from PBT and PSAN or to use segmented copolymers, such as block copolymers of multiblock copolymers made from at least one segment of PBT with $M_w$>1000 and from at least one segment of PSAN or from a PSAN-compatible/miscible segment with $M_w$>1000.

The last named polymers may also improve linking to other blend polymers, for example to copolymers based on vinyl aromatic monomers and acrylonitrile and/or methacrylonitrile. Possible blend components of this type are (α-methyl)styrene/(meth)acrylonitrile.

Component D

The fillers used as component D may be present in amounts of from 0 to 50% by weight. These are preferably commercially available glass fibers. These generally have an average length of from 0.1 to 0.5 mm, preferably from 0.1 to 0.4 mm, and a diameter of from 6 to 20 μm. Particular preference is given to glass fibers made from E glass. To improve adhesion, the glass fibers may have been coated with organosilanes, epoxy silanes or other polymer coatings.

Component E

The novel molding compositions may comprise, as component E, from 0 to 10% by weight, preferably from 0 to 7.5% by weight, particularly preferably from 0 to 5% by weight, of other conventional additives.

Examples of additives of this type are: UV stabilizers, oxidation retarders, dyes, pigments, colorants, nucleating agents, antistats, antioxidants, stabilizers to improve thermal stability, to increase light stability, or to raise hydrolysis resistance and chemicals resistance, agents to prevent decomposition by heat, and in particular, in addition to the mold-release agents used according to the invention, lubricants useful for producing moldings. These other additives may be fed at any stage of the preparation process, but preferably at an early juncture so as to make use at an early stage of the stabilizing effects (or other specific effects) of the additive. Heat stabilizers or oxidation retarders are usually metal halides (chlorides, bromides or iodides) derived from metals in group I of the Periodic Table of the Elements (for example Li, Na, K or Cu).

Suitable stabilizers are the usual hindered phenols, or else vitamin E or compounds of similar structure. HALS stabilizers (Hindered Amine Light Stabilizers) are also suitable, as are benzophenones, resorcinols, salicylates, benzotriazoles and other compounds (for example Irganox®, Tinuvin®, such as Tinuvin® 770 (HALS absorber, bis(2,2,6,6-tetramethyl-4-piperidyl)sebacate) or Tinuvin® P (UV absorber—(2H-benzotriazol-2-yl)-4-methylphenol) or Topanol®). The amounts of these usually used are up to 2% by weight, based on the entire mixture.

Other possible additives are silicone oils, oligomeric isobutylene or similar substances, usually in amounts of from 0.05 to 5% by weight. Pigments, dyes, color brighteners, such as ultramarine blue, phthalocyanines, titanium dioxide, cadmium sulfides and derivatives of perylenetetracarboxylic acid may also be used. Another additive which may be used is carbon black, either pure or as a masterbatch.

The amounts used of processing aids and stabilizers, such as UV stabilizers, lubricants and antistats, are usually from 0.01 to 5% by weight, based on the entire molding composition.

It is also possible to use amounts of, for example, up to 5% by weight, based on the entire molding composition, of nucleating agents, such as talc, calcium fluoride, sodium phenylphosphinate, alumina or finely divided polytetrafluoroethylene. Amounts of up to 5% by weight, based on the molding composition, of plasticizers, such as dioctyl phthalate, dibenzyl phthalate, butyl benzyl phthalate, hydrocarbon oils, N-(n-butyl)benzenesulfonamide, or o- or p-toluene-ethylsulfonamide are advantageously added. It is also possible to add amounts of up to about 5% by weight, based on the molding composition, of colorants, such as dyes and pigments.

Components A, B and, if desired, C to E may be mixed in any desired manner using any of the known methods. Components A–E may be mixed as such, or else in the form of mixtures of one component with one or more of the other components. For example, the novel thermoplastic molding compositions may be prepared by mixing component A with each of components B and C or with a mixture made from these, and with component E if desired, melting the product in an extruder and feeding the glass fibers D via an inlet on the extruder.

The novel molding compositions may be processed by known methods of thermoplastic processing to give moldings. In particular, these may be produced by thermoforming, extruding, injection molding, calendering, blow molding, compression molding, press sintering, thermoforming or sintering, preferably by injection molding. The present invention also provides the moldings which may be produced from the novel molding compositions.

The thermoplastic molding compositions may be used to produce moldings, fibers or films. These moldings preferably derive from the household, food and drink or medical sectors. In the household sector they may be used, for example, for parts for deep-fat fryers, such as lid parts and handles, and in the health sector for toothbrush heads or brushes, for example. The novel thermoplastic molding compositions are also suitable for other moldings used in the household sector, preferably in the kitchen sector. These include bread-baking equipment, toasters, table-top grills, kitchen machinery, electric tin openers and juice presses. In these articles the novel molding compositions are preferably used to produce switches, housings, handles or lids. The novel molding compositions may also be used for moldings in cookers, where particular preference is given to cooker handles, to cooker knobs and to switches.

The novel molding compositions may also be used in moldings which meet the requirements of the Federal Drug Administration or of equivalent national authorities in other countries. In this sector, particular preference is given to packaging for medicines and to outer packs for medicine kits.

The novel molding compositions may also be used in the food and drink packaging sector. Preference is given here to boxes, pots, dishes, and containers of other types, all of which are moldings made from the novel molding compositions.

In the context of applications for the novel molding compositions particular emphasis should be given to their food compatibility and their resistance to fats and liquids, which is particularly useful in parts of household equipment.

The use of the glycerol bisstearates defined above has proven particularly successful in molding compositions for producing moldings which may be exposed to high temperatures. Particular moldings of this type are headlamp parts used in the area of the headlamp, in which temperatures over 100° C., preferably 110° C. and particularly preferably 130° C. and up to a maximum of 200° C. may occur when the headlamp is operating. Parts of this type may be either glass-fiber-reinforced or else not glass-fiber-reinforced. Preferred headlamp parts are headlamp frames.

The particular use of the abovementioned glycerol bisstearates in producing headlamp parts is that in headlamp parts of this type with a reflecting surface no matting of this surface occurs. In addition, when the glycerol bisstearates defined above are used, even after a relatively long period of operation of the headlamp there are no deposits on the transparent areas of the headlamp which transmit the light, and metalized surfaces of these moldings retain their reflective properties.

The use of the glycerol bisstearates defined above also allows the other advantageous properties to be achieved, for example low cycle times, no formation of mold deposits during injection molding, and excellent quality of the metalized surfaces.

In particular, no haze is observed on the metalized surface as a result of any uncontrolled migration of the mold-release agent when the molding is heated to 100–200° C., preferably 110–180° C. and particularly preferably 130–170° C., and it is therefore possible to obtain moldings with surfaces having long-lasting reflective properties when metalized.

The use of the glycerol bisstearates defined above has also proven successful in the production of large-surface-area moldings which are comparatively thin in relation to their surface area and for which an excellent demolding performance is necessary. Particular large-surface-area moldings of this type are sun-roof crossmembers, bodywork parts, air inlet grilles, parts of instrument panels, such as instrument-panel supports, covers, air ducts, add-on parts, in particular for the center console, as a part of the glove compartment, and protective surrounds for tachometers.

Other possible applications are in the medical technology sector. The novel molding compositions may also be used in any of the other known applications for polybutylene terephthalate which do not require compatibility with foods and with the human body.

The invention will be described in greater detail in the examples below.

EXAMPLES

To prepare the molding compositions, polybutylene terephthalate (PBT) with a viscosity number (VN) of 130 was used. In the reference compositions a fully esterified pentaerythritol was used as mold-release agent, and in the novel molding compositions glycerol bisstearate was used. Glass fibers were used in some of the compositions.

Mechanical properties were determined as follows:

Impact strength was determined to ISO 179/1eU. Notched impact strength was determined to ISO 179/1eA. Modulus of elasticity was determined to ISO 527-2. Yield stress was determined to ISO 527-2. Elongation at break was determined to ISO 527-2. The results are listed in the tables below.

TABLE 1

| | Mixing specifications (data in parts by weight) | | | |
|---|---|---|---|---|
| Starting material | Reference I | Molding composition I | Reference II | Molding composition II |
| PBT (VN = 130) | 99.35 | 99.35 | 79.48 | 79.48 |
| Glass fiber | — | — | 20 | 20 |
| Fully esterified pentaerythritol | 0.65 | — | 0.52 | — |
| Glycerol bisstearate | — | 0.65 | — | 0.52 |

TABLE 2

DIN/ISO tests

| Property | Unit | Reference I | Molding composition I | Reference II | Molding composition II |
|---|---|---|---|---|---|
| Pellets | | | | | |
| MVR 250/2.16 | cm$^3$/10' | 24 | 26 | 17 | 17 |
| VN | ml/g | 126 | 131 | 107 | 106 |
| Max. crystallization temperature | °C. | 185.3 | 185.7 | 186.1 | 184.1 |
| Injection molding | | | | | |
| ISO 179/leU | kJ/m$^2$ | 280 | NB | 56 | 54 |
| ISO 179/leA | kJ/m$^2$ | 6 | 6 | 7 | 8 |
| Modulus of elasticity | MPa | 2500 | 2500 | 7700 | 7800 |
| Yield stress | MPa | 57 | 57 | 118 | 119 |
| Elongation at break | % | 80 | 88 | 3.4 | 3.3 |
| Minimum cycle time | s | 12.2 | 11.7 | 8.3 | 9.5 |
| without mold-release agent | s | 260/60*) | 260/60*) 22 | 250/80*) | 250/280*) 25 |
| Mold deposit after 100 shots | Visual *) | 0 260/60 | 0 260/60 | 0 250/80 | 0 250/80 |
| Storage 11d/150° C. | Visual ++) | – | + | – | + |
| FDA-compliant | | No | Yes | No | Yes |

*) Melt/mold-surface temperature
++) Deposit detectable = –, not detectable = +
NB No fracture

We claim:

1. A thermoplastic molding composition consisting essentially of components A, a polyester, and component B, a mold release agent, and, optionally, components C, D and/or E as follows:

a) as component A, from 40 to 99.99% by weight of at least one polyester based on poly-$C_2$–$C_6$-alkylene terephthalates, b) as component B, from 0.01 to 3% by weight of glycerol bis (fatty acid) esters of $C_{12}$–$C_{24}$-fatty acids, wherein the fatty acids may have a hydroxyl group and from 1 to 3 carbon-carbon double bonds, c) as component C, from 0 to 49.99% by weight of blend polymers miscible with component A or dispersible therein, d) as component D, from 0 to 50% by weight of fillers, and e) as component E, from 0 to 10% by weight of other additives, selected from the group consisting of UV stabilizers, oxidation retarders, dyes, pigments, colorants, nucleating agents, antistats, antioxidants, stabilizers to improve thermal stability, to increase light stability, or to raise hydrolysis resistance and chemicals resistance, agents to prevent decomposition by heat, and in addition to said mold-release agent, lubricants useful for producing moldings wherein the total percentages add up to 100%.

2. A thermoplastic molding composition as defined in claim 1, wherein component A is polybutylene terephthalate.

3. A thermoplastic molding composition as defined in claim 1, wherein the glycerol bis (fatty acid) esters derive from $C_4$–$C_{20}$-fatty acids.

4. A molding, a fiber or a film prepared from a thermoplastic molding composition as defined in claim 1.

* * * * *